United States Patent
Gebauer et al.

(10) Patent No.: US 10,625,210 B2
(45) Date of Patent: Apr. 21, 2020

(54) MIXING METHOD AND SYSTEM

(71) Applicant: GE HEALTHCARE BIO-SCIENCES AB, Uppsala (SE)

(72) Inventors: Klaus Gebauer, Uppsala (SE); Partha Sarathy Doddapadam Srinivasa Raghavachar, Bangalore (IN); Narendra G R, Bangalore (IN); Nachiket Karmarkar, Bangalore (IN); Ajit S. Vernekar, Bangalore (IN); Prashanth Hosabettu Mohan, Bangalore (IN); Sasi Kumar Nutalapati, Bangalore (IN)

(73) Assignee: GE Healthcare Bio-Sciences AB, Uppsala (SE)

( * ) Notice: Subject to any disclaimer, the term of this patent is extended or adjusted under 35 U.S.C. 154(b) by 92 days.

(21) Appl. No.: 15/769,461

(22) PCT Filed: Oct. 28, 2016

(86) PCT No.: PCT/EP2016/076046
§ 371 (c)(1),
(2) Date: Apr. 19, 2018

(87) PCT Pub. No.: WO2017/080846
PCT Pub. Date: May 18, 2017

(65) Prior Publication Data
US 2018/0304199 A1   Oct. 25, 2018

(30) Foreign Application Priority Data
Nov. 10, 2015 (IN) .................... 3675/DEL/2015

(51) Int. Cl.
*B01D 61/20* (2006.01)
*B01F 15/00* (2006.01)
*B01F 5/10* (2006.01)

(52) U.S. Cl.
CPC ............ *B01D 61/20* (2013.01); *B01F 5/10* (2013.01); *B01F 5/102* (2013.01);
(Continued)

(58) Field of Classification Search
CPC . B01D 61/20; B01F 5/10; B01F 5/102; B01F 15/0085; B01F 15/00253; B01F 15/00136
See application file for complete search history.

(56) References Cited

U.S. PATENT DOCUMENTS

| | | | | |
|---|---|---|---|---|
| 5,277,691 A | * | 1/1994 | Eaton | ............... B01D 19/0052 |
| | | | | 210/741 |
| 2010/0130761 A1 | * | 5/2010 | Boam | ................. B01D 61/022 |
| | | | | 554/21 |
| 2013/0029411 A1 | * | 1/2013 | Roy | ..................... C12M 47/02 |
| | | | | 435/325 |

FOREIGN PATENT DOCUMENTS

| | | |
|---|---|---|
| EP | 2623564 A1 | 8/2013 |
| EP | 2641877 A1 | 9/2013 |

(Continued)

OTHER PUBLICATIONS

PCT International Search Report for PCT Application No. PCT/EP2016/076046 dated Jan. 27, 2017 (10 pages).

(Continued)

*Primary Examiner* — Chester T Barry
(74) *Attorney, Agent, or Firm* — Eversheds Sutherland (US) LLP

(57) ABSTRACT

A method and a system for improving mixing of content in a container 3 provided in a filter system 1, said method comprising providing a mixing loop 13 parallel to a recirculation flow path 11 of the filter system 1.

10 Claims, 1 Drawing Sheet

(52) U.S. Cl.
CPC .... *B01F 15/0085* (2013.01); *B01F 15/00136* (2013.01); *B01F 15/00253* (2013.01); *B01D 2311/25* (2013.01); *B01D 2313/083* (2013.01); *B01D 2315/16* (2013.01)

(56) References Cited

FOREIGN PATENT DOCUMENTS

| IT | 1121108 B | * | 3/1986 |
| JP | 2006141185 A | * | 6/2006 |
| WO | 2009/148499 A2 | | 12/2009 |
| WO | 2015/157031 A1 | | 10/2015 |

OTHER PUBLICATIONS

Zhou et al., "Separation of Hyaluronic Acid From Fermentation Broth by Tangential Flow Microfiltration and Ultrafiltration," Separation and Purification Technology, 2006, 52:29-38.

* cited by examiner

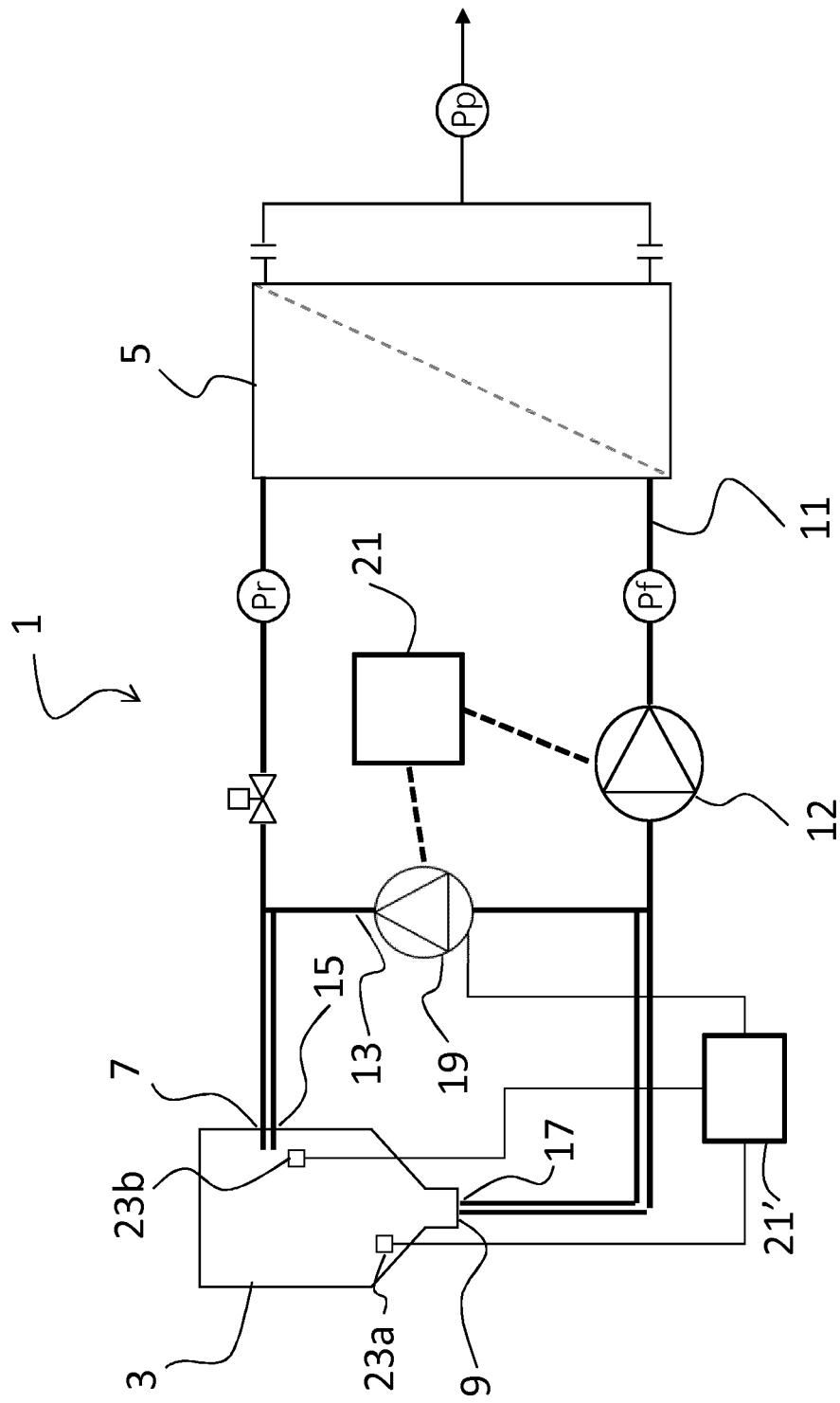

MIXING METHOD AND SYSTEM

CROSS REFERENCE TO RELATED APPLICATIONS

This application claims the priority benefit of PCT/EP2016/076046 filed on Oct. 28, 2016 which claims priority benefit of Indian Application No. 3675/DEL/2015 filed Nov. 10, 2015. The entire contents of which are hereby incorporated by reference herein.

TECHNICAL FIELD OF THE INVENTION

The present invention relates to a method and a system for improving mixing of the content in a container provided in a filter system.

BACKGROUND OF THE INVENTION

Mixing in disposable, flexible bags in for example filtration systems is often required but not always achieved in a sufficient way.

Larger mixing systems employ typically magnetic impellers with corresponding magnetic drive units that are comprised in a dedicated mixer apparatus. At these systems, the flexible bag is confined and supported by rigid walls and a frame and the magnetic drive unit is integrated in said frame. One such example is the Xcellerex™ XDUO Quad Mixing system.

Smaller flexible bags of typically up to 20 L volume may be used without the support of support walls in a hanging configuration. These hanging bags have typically no active mixing element.

One mixing method for disposable, flexible hanging bags has been described in WO 2014085034. Here a container having a magnetic impeller assembly with a hood is described. The hood protects the flexible bag from the impeller, especially during transportation.

A drawback with these methods including impellers in the bags is that the bags can get damaged by the impeller. Another drawback with this design is that it requires dedicated bags equipped with the impeller element. Also, it requires a specific external arrangement with a magnetic drive unit to engage the impeller at side of the bag. Another drawback with this design is that it reduces accuracy when the volume and/or weight of the fluid in the bag is to be determined by measuring the weight of the bag.

SUMMARY

An object of the present invention is to provide an improved method and system for mixing the content in a container in a filtration system.

This is achieved by a method for improving mixing of content in a container provided in a filter system, said method comprising providing a mixing loop parallel to a recirculation flow path of the filter system.

This is also achieved by a filter system comprising a container with a content connected to a filter by a recirculation flow path, wherein the filter system further comprises a mixing loop parallel to the recirculation flow path.

Hereby a container without impeller and without the need of an external arrangement for driving the impeller can be used and still the mixing of the content in the container will be achieved. Hereby also the cost for the containers can be limited and the possibility to use different kinds of containers will be improved. Furthermore, if weighing of the container is needed it is an advantage that the container is not in contact with a magnetic drive.

According to one embodiment of the invention the method further comprises controlling a mixing pump provided in the mixing loop in dependence of properties of content in the system and/or conditions in the system and the filter system further comprises a control system arranged to control a mixing pump provided in the mixing loop in dependence of properties of content in the system and/or conditions in the system. Hereby the mixing can be optimized for different conditions.

According to one embodiment of the invention the method further comprises controlling a mixing pump provided in the mixing loop in dependence of the operational conditions of a feed pump aimed to supply content from the container to a filter provided in the recirculation flow path. Correspondingly the filter system comprises a control system arranged to control a mixing pump provided in the mixing loop in dependence of the operational conditions of a feed pump provided in the recirculation flow path. Hereby the two pumps are coordinated and the mixing pump can be used when the feed pump is not operating or operates at a flow rate not giving a sufficiently mixing to the content in the container.

Further embodiments of the invention are described in the dependent claims and in the detailed description.

BRIEF DESCRIPTION OF THE DRAWINGS

FIG. 1 shows schematically a filter system according to the invention.

DETAILED DESCRIPTION OF THE EMBODIMENTS

FIG. 1 shows schematically a filter system 1 according to the invention. The filter system comprises a container 3. The container 3 can be a flexible, disposable bag, such as a hanging bag, for example a pillow formed bag. The container 3 could also be another kind of flexible, disposable bag provided hanging or standing alone or provided inside a hard container. The container 3 could even be a stainless steel container. The mixing method according to the invention will be suitable for all these alternatives of containers and flexibility will be improved and cost will be decreased because of the avoidance of impeller and magnetic drive. Furthermore, if weighing of the container is needed it is an advantage that the container is not in contact with a magnetic drive. This applies in especially to smaller hanging bags where the weight of the hanging bag can be measured by a single load cell above the bag rather than measuring weight by multiple load cells integrated in the lower frame of the bag holding device. The latter design is typical for larger single use containers and bags, like for example the Xcellerex™ XDUO Quad Mixing system.

The filter system further comprises a filter 5, which is connected to a recirculation inlet 7 of the container 3 and to a recirculation outlet 9 of the container by a recirculation flow path 11. The filter 5 is in this example a tangential flow filtration, TFF, filter which typically is provided in either flat sheet configurations or hollow-fibre configurations. Other configurations of TFF filters are feasible. The filter 5 could also be another kind of device that requires a feed flow to be split into two fluid flows of different properties with one of the flows being redirected to the container, such as for example a hydrocyclone or other types of separation or processing devices. A combined requirement for all of mentioned filter types is that good mixing in the container needs to be maintained. For devices with a fluid flow returning into the container, homogenization of the fluid in the container is required as the returning fluid flow typically has different properties than the fluid in the container, such as differences in concentration etc. Furthermore a feed pump 12 is provided in the recirculation flow path between the recirculation outlet 9 of the container and the filter 5. The feed pump pumps content from the container through the recirculation flow path and via the filter.

According to the invention a mixing loop 13 is provided in parallel with the recirculation loop 11. The mixing loop is connected to a mixing inlet 15 of the container and to a mixing outlet 17 of the container. The mixing inlet 15 of the container could be the same as the recirculation inlet 7 of the container and the mixing outlet 17 of the container could be the same as the recirculation outlet 9 of the container. They could also be separated. Furthermore parts of the recirculation flow path 11 can be the same as the mixing loop 13. Further according to the invention a mixing pump 19 is provided in the mixing loop 13. The mixing pump pumps content from the container 3 through the mixing loop 13. The mixing pump is in one embodiment of the invention a disposable pump, such as for example a centrifugal pump, a magnetically driven and coupled centrifugal mixing pump with a disposable head, a diaphragm pump, a lobe pump or a peristaltic pump. The mixing loop 13 can in one embodiment of the invention be provided as an optional module that can be connected if there is a need for it. In this case the mixing loop 13 can be provided with aseptic connectors for easy and aseptic connection to the system. Furthermore the mixing loop 13 can be provided with valves such that the mixing loop easily can be disconnected.

According to one embodiment of the invention the mixing pump 19 and the feed pump 12 are connected (by wire or wirelessly) to a control system 21 of the filter system 1. The control system 21 is arranged to control the mixing pump 19 in dependence of the operational conditions of the feed pump 12. In one embodiment of the invention the mixing pump does not need to be turned on and contribute to the mixing in the container when the feed pump pumps content from the container at a flow rate above a predefined threshold rate. However, when the feed pump pumps content from the container at a flow rate below said predefined threshold rate the mixing pump should be controlled by the control system 21 to be switched on. The flow rate in the mixing loop 13 can be controlled by controlling the mixing pump 19 from the control system 21 in dependence of the flow rate in the recirculation flow path 11. In one embodiment the mixing pump 19 can pump at different flow rates, while in another embodiment the mixing pump 19 can be operated at one flow rate and may be engaged in an intermittent fashion.

According to another embodiment of the invention the mixing pump can be controlled in dependence of sensors 23a, 23b provided in the system instead of or in complement to in dependence of the operation conditions of the feed pump. Sensors can be provided inside the container and/or in the recirculation flow path and/or in the mixing loop. The sensors could for example measure concentration, absorbance or viscosity and these measured values could be used for controlling the mixing pump. Suitably a control system 21' gathers data from the sensors 23a, 23b and controls the mixing pump 19. If for example two sensors positioned in different locations in the container show different values the mixing pump could be started or its pumping flow rate and thereby the mixing intensity could be raised. Threshold values for the differences should suitably be set for the control of the mixing pump, i.e. the mixing pump is not started until there is a difference in measured values from two sensors above a threshold difference.

According to the invention the mixing pump can be controlled in dependence of one or more factors. This could be properties of content/fluids in the system and/or other types of conditions in the system. The properties of the content in the system can be fluid properties of fluids in any part of the system measured by for example different types of sensors. It can be content in the container or fluid/content in any of the fluid lines of the system, for example retentate or permeate flow or a separate flow into the container such as the addition of diafiltration buffer in a diafiltration operation or the addition of sample in a fed batch concentration. Conditions in the system can for example be amount of fluid flow in the system, operational performance of other pumps than the mixing pump in the system or the volume of the content in the container or the weight of content in the container or the weight of the whole container. Conditions in the system may also be calculated parameters such as volumetric information. Further, conditions in the system may be determined by time and/or elapsed time, the status of control systems, information derived from collected or evaluated data and user interactions. The skilled in the art will acknowledge that there are more examples. The mixing pump can be controlled in dependence of one or more of these different conditions or properties.

In the schematic drawing of FIG. 1 it is shown that the recirculation inlet 7 and the mixing inlet 15 are provided to the top part of the container 3 and the recirculation outlet 9 and the mixing outlet 17 are provided at the lowest part of the container 3. This is however not necessary. For example both inlets and outlets could be provided to the same side of the container, for example the lower part of the container.

The filter system according to this system can easily be adapted for single use/disposable. The container, the flow lines, the filter and the mixing loop with the mixing pump are in one embodiment of the invention pre-sterilized. The mixing loop according to this invention could also be useful in other types of systems where no recirculation flow path is present. Instead of the filter 5 as described above there could be provided a separation or processing device which does not require the feed flow to be split into two fluid flows but instead the fluid being rather quantitatively processed and directed into a single, processed, fluid flow downstream the filter and device, respectively. Such a filter could be a normal flow filter (dead-end filter) or filter with adsorptive properties, such as for example membrane adsorbers. While NFF filters typically provide a solid liquid separation by removing particles, membrane adsorbers provide a separation of components in solution by for example ion exchange or affinity interactions between the components to be separated and the membrane adsorber. Further, several of the above mentioned processing mechanisms, device formats and fluid flows can be combined. Even in absence of a fluid flow returning to the container there is a need to ensure homogeneity in the container and to avoid for example sedimentation processes when processing cells, other particulates or fluids that tend to a separation into different fractions or phases without active mixing. Hereby the mixing loop of this invention can be useful also in these systems.

The invention claimed is:

1. A method for improving mixing of content in a container provided in a filter system, said container being connected to a filter by a recirculation flow path, said method comprising providing a mixing loop to the container, said mixing loop being provided in parallel with the recirculation flow path of the filter system, further comprising controlling a mixing pump provided in the mixing loop in dependence of operational conditions of a feed pump arranged to supply content from the container to the filter and further comprising the steps of:

switching the mixing pump on when the feed pump pumps feed to the filter at a flow rate below a predefined threshold rate; and/or switching the mixing pump off when the feed pump pumps feed to the filter at a flow rate above a predefined threshold rate.

2. The method according to claim 1, further comprising controlling a mixing pump provided in the mixing loop in dependence of properties of content in the system and/or conditions in the system.

3. A method for improving mixing of content in a container provided in a filter system, said container being connected to a filter by a recirculation flow path, said method comprising providing a mixing loop to the container, said mixing loop being provided in parallel with the recirculation flow path of the filter system, further comprising controlling a mixing pump provided in the mixing loop in dependence of sensor responses from at least two sensors provided at different locations in the system, said sensors measuring the same property of the content in the container.

4. A method for improving mixing of content in a container provided in a filter system, said container being connected to a filter by a recirculation flow path, said method comprising providing a mixing loop to the container, said mixing loop being provided in parallel with the recirculation flow path of the filter system, further comprising controlling a mixing pump provided in the mixing loop in dependence of fluid flow into the container provided from an additional pump and fluid line separate from the recirculation flow path.

5. A filter system comprising a container with a content connected to a filter by a recirculation flow path, wherein the filter system further comprises a mixing loop in connection with the container, said mixing loop being provided in parallel with the recirculation flow path, and further comprising a control system arranged to control a mixing pump provided in the mixing loop in dependence of sensor responses from at least two sensors provided at different locations in the system and measuring the same property of the content in the container.

6. The filter system according to claim 5, further comprising a control system arranged to control a mixing pump provided in the mixing loop in dependence of properties of content in the system and/or conditions in the system.

7. The filter system according to claim 5, wherein the control system is further in dependence of operational conditions of a feed pump provided in the recirculation flow path.

8. The filter system according to claim 7, wherein said filter system comprises the container with a content, the filter connected by the recirculation flow path to a recirculation inlet and a recirculation outlet of the container and a feed pump provided in the recirculation flow path pumping content of the container to the filter, wherein the filter system further comprises the mixing loop parallel to the recirculation flow path, said mixing loop comprising a mixing pump and is connected to a mixing inlet and a mixing outlet of the container and said filter system comprising the control system which can communicate with both the mixing pump and the feed pump.

9. A filter system comprising a container with a content connected to a filter by a recirculation flow path, wherein the filter system further comprises a mixing loop in connection with the container, said mixing loop being provided in parallel with the recirculation flow path, wherein the filter system further comprises a control system arranged to control a mixing pump provided in the mixing loop in dependence of operational conditions of a feed pump provided in the recirculation flow path and the container with a content, the filter connected by the recirculation flow path to a recirculation inlet and a recirculation outlet of the container and a feed pump provided in the recirculation flow path pumping content of the container to the filter, wherein said mixing loop comprising the mixing pump is connected to a mixing inlet and a mixing outlet of the container, and said filter system comprising the control system can communicate with both the mixing pump and the feed pump; and wherein the control system further is arranged to control the mixing pump to be switched on when the feed pump pumps feed to the filter at a flow rate below a predefined threshold rate and/or control the mixing pump to be switched off when the feed pump pumps feed to the filter at a flow rate above a predefined threshold rate.

10. The filter system according to claim 5, wherein the container is a hanging bag.

* * * * *